United States Patent
Stipe

(10) Patent No.: US 7,536,773 B2
(45) Date of Patent: May 26, 2009

(54) METHOD OF CONFIGURING A SENSOR FOR A HARD DISK DRIVE

(75) Inventor: Barry Cushing Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 543 days.

(21) Appl. No.: 11/229,930

(22) Filed: Sep. 19, 2005

(65) Prior Publication Data

US 2007/0064348 A1    Mar. 22, 2007

(51) Int. Cl.
*G11B 5/187* (2006.01)
(52) U.S. Cl. ............... 29/603.12; 29/603.1; 29/603.15; 29/603.16; 451/8; 451/28; 360/119.02; 360/119.03; 360/122; 360/324
(58) Field of Classification Search ............. 29/603.07, 29/603.01, 603.08, 603.09, 603.1, 603.12, 29/603.15, 603.16; 360/119.02, 119.03, 360/122, 320, 324; 451/8, 28, 41
See application file for complete search history.

(56) References Cited

U.S. PATENT DOCUMENTS

| 5,463,805 | A | 11/1995 | Mowry et al. |
|---|---|---|---|
| 5,722,155 | A | 3/1998 | Stover et al. |
| 5,772,493 | A | 6/1998 | Rottmayer et al. |
| 5,913,550 | A | 6/1999 | Watanuki |
| 6,370,763 | B1 * | 4/2002 | Watanuki et al. ......... 29/603.09 |
| 6,560,077 | B2 | 5/2003 | Fujiwara et al. |
| 6,609,948 | B1 | 8/2003 | Fontana, Jr. |
| 6,686,068 | B2 | 2/2004 | Carey et al. |
| 6,758,721 | B2 | 7/2004 | Shindo et al. |

FOREIGN PATENT DOCUMENTS

JP          60076011 A   *   4/1985

* cited by examiner

*Primary Examiner*—A. Dexter Tugbang
(74) *Attorney, Agent, or Firm*—Bracewell & Giuliani LLP

(57) ABSTRACT

A nano-sized CPP aperture is precisely positioned to within a few nanometers of a slider ABS surface to maximize a signal from the disk and to prevent lapping damage to the aperture itself. A linear array of apertures is aligned perpendicular to the ABS plane. The head resistance is monitored during lapping. Each time an aperture is lapped through, there is an increase in head resistance that is equal to the inverse of the total aperture area. There are three equal-sized apertures that are evenly spaced apart. When the first aperture is lapped through, there is a 50% increase in resistance, and a 100% increase in resistance when the second aperture is lapped through. These resistance increases are very large and are easy to distinguish from noise.

10 Claims, 3 Drawing Sheets

METHOD OF CONFIGURING A SENSOR FOR A HARD DISK DRIVE

BACKGROUND OF THE INVENTION

1. Technical Field

The present invention relates in general to sensors used in hard disk drives and, in particular, to an improved system, method, and apparatus for configuring giant magneto-resistance sensors with current-perpendicular-to-the-plane apertures.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

In HDDs, giant magneto-resistance (GMR) sensors having a current-perpendicular-to-the-plane (CPP) configuration offer a number of advantages over current-parallel-to-the-plane (CIP) GMR sensors. In particular, the effective width of CIP sensors, which contributes to the GMR signal, cannot easily be scaled to less than 75 nm, which is necessary for areal densities greater than about 200 Gb/in$^2$. In contrast, CPP sensors can be scaled to less than 75 nm without degradation in the GMR signal. However, one problem with all-metallic CPP sensors is very low resistance, which leads to either low voltage output or very high current. Low voltage output can cause problems with low head signal-to-noise ratio (SNR), especially when the CPP resistance is as small as the series lead resistance, whereas high current can lead to problems with magnetic torque noise, which also degrades head SNR. Thus, an improved solution that overcomes these problems would be desirable.

SUMMARY OF THE INVENTION

One embodiment of a solution to the defined problem is a "nano-oxide" layer in the CPP stack. This layer only lets current through random holes in the oxide film. This reduces the current for a given voltage, which in turn reduces the torque-noise problem. However, the random nature of the oxide holes can lead to significant statistical fluctuations in behavior from head to head. It is desirable to have control over the position and size of the holes. It also is desirable to have a single, lithographically-defined, nano-sized, metallic-filled hole in an oxide barrier within the CPP multilayer stack. This hole may be on the order of 5 nm to 40 nm in size, and may be defined by e-beam lithography.

The nano-sized CPP aperture needs to be precisely positioned to within a few nanometers of the slider ABS surface to maximize the signal from the disk and to prevent lapping damage to the aperture itself. In one embodiment, a linear array of apertures is aligned perpendicular to the ABS plane. The head resistance is monitored during lapping. Each time an aperture is lapped through, there is an increase in head resistance that is equal to the inverse of the total aperture area.

In one embodiment, there are three equal-sized apertures that are evenly spaced apart. When the first aperture is lapped through, there is a 50% increase in resistance. Moreover, there is a 100% increase in resistance when the second aperture is lapped through. These resistance increases are very large and are easy to distinguish from noise. One source of noise is the result of smearing of conducting materials across the oxide barrier at the lapping surface. These conducting materials are typically very thin (with a cross-sectional area that is much smaller than the apertures), and lead to small drops in resistance when they form.

The small downward spikes in resistance are readily distinguished from the large increase in resistance when an aperture is lapped through. Moreover, the second-to-last aperture is made larger than the final aperture, which would cause an even more dramatic increase in resistance when it is lapped. Finally, the spacing between the apertures may follow a pattern (e.g., evenly spaced apart, etc.) to make it easier to distinguish the aperture lapping from any resistance noise, and to calculate a lapping rate. The spacing between the third-to-last aperture and the second-to-last aperture is made unique so that it is easier to recognize position and stop the lapping at the desired location between the second-to-last aperture and the last aperture.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 1 is a schematic plan view of a hard disk drive constructed in accordance with the present invention.

DETAILED DESCRIPTION OF THE INVENTION

Figure 1:
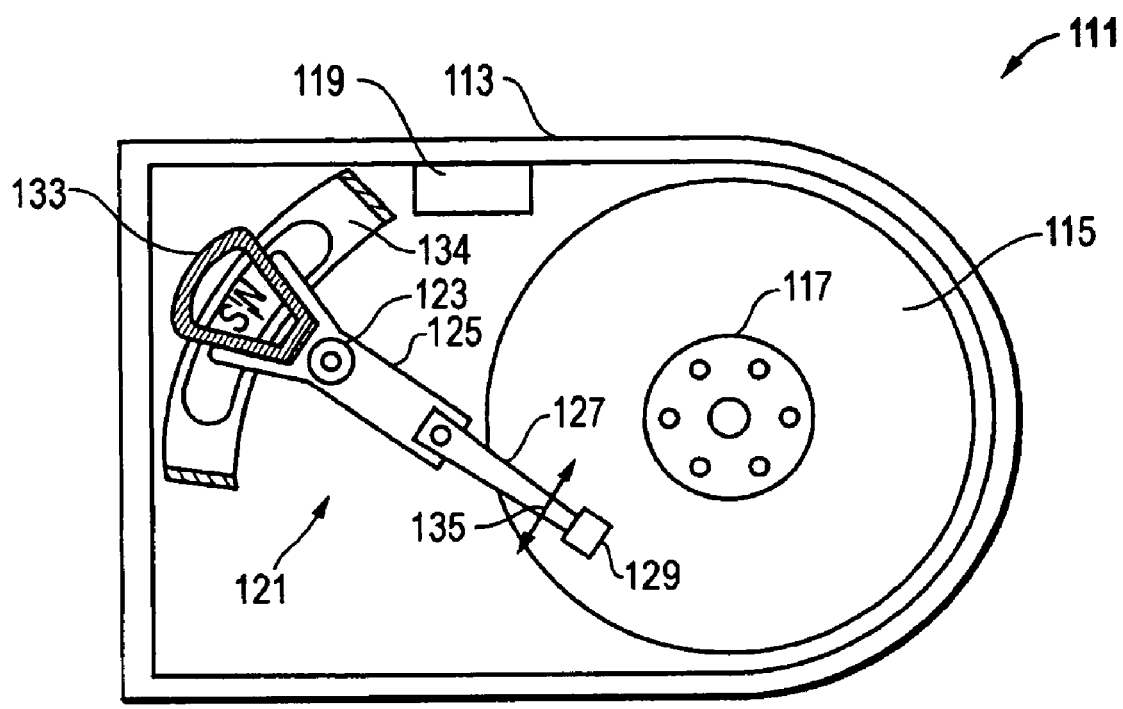

Referring to FIG. 1, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write head has a sensor that magnetically reads data from and/or magnetically writes data to disk 115. The level of integration called the head gimbal assembly is head and the slider 129, which are mounted on suspension 127. The slider 129 is usually bonded to the end of suspension 127. The head may be formed at various sizes, including pico size (approximately 1250×1000×300 microns), and formed from, for example, ceramic or intermetallic materials. In another embodiment, the head may be femto size (approximately 850×700×230 microns) and, in one embodiment, is pre-loaded against the surface of disk 115 (in the range two to ten grams) by suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
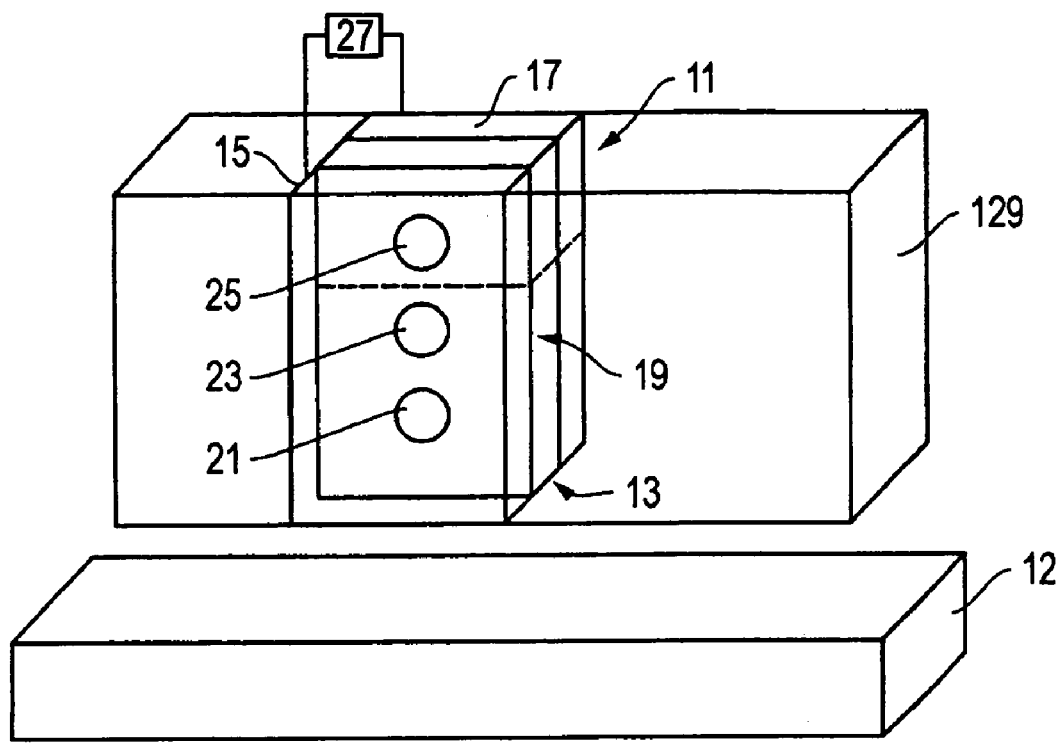
FIG. 2 is a schematic isometric view of a sensor for the hard disk drive of FIG. 1 shown prior to lapping and constructed in accordance with the present invention.

Referring now to FIG. 2, one embodiment of a sensor 11 that is located in slider 129 is shown along side a lapping device 12, such as a lapping plate. Sensor 11 has a current-perpendicular-to-the-plane (CPP) configuration that forms a CPP stack with an air bearing surface 13. The CPP stack includes at least two metallic layers 15, 17 and an insulation layer 19 that is located between the two metallic layers 15, 17. The insulation layer 19 may be provided as an oxide barrier film, for example. The insulation layer 19 has one or more apertures 21, 23, 25 (e.g., three shown) that are filled with an electrically conductive material, such as a metallic substance. The filled apertures 21, 23, 25 permit electrical current to pass through insulation layer 19 between the two metallic layers 15, 17 to reduce the electrical current required for a given voltage, which in turn reduces a torque-noise of the sensor 11.

In one embodiment, the apertures 21, 23, 25 are defined lithographically and on the order of 40 nm or less (e.g., diameter, if circular). In another embodiment, the apertures 21, 23, 25 are on the order of 5 nm to 40 nm in size. In the embodiment shown, the apertures 21, 23, 25 (and especially the final aperture 25) is positioned within a few nanometers of the air bearing surface 13 to maximize a signal from the disk 115 (FIG. 1) and to prevent lapping damage to the final aperture 25. The apertures 21, 23, 25 may comprise a linear array of apertures (as shown) that is aligned perpendicular to a plane of the air bearing surface 13. Moreover, the apertures 21, 23, 25 may vary in size and the spacing between them may vary as well.

The present invention is well suited for use in a system for providing a sensor in a hard disk drive. The system comprises a hard disk drive 111 (FIG. 1) having a disk 115 and a sensor 11 (FIG. 2) for reading data from and writing data to the disk 115. As described above, the sensor 111 has a current-perpendicular-to-the-plane (CPP) configuration that forms a CPP stack with an air bearing surface 13. The CPP stack includes at least two metallic layers 15, 17 and an insulation layer 19 between the two metallic layers 15, 17. The insulation layer 19 has a plurality of apertures 21, 23, 25 (e.g., three shown) that are filled and formed therein to permit electrical current to pass therethrough between the two metallic layers 15, 17 to reduce the electrical current for a given voltage. The apertures 21, 23, 25 may comprise a linear array of apertures that are aligned perpendicular to a plane of the air bearing surface 13 of the sensor 11.

Figure 3:
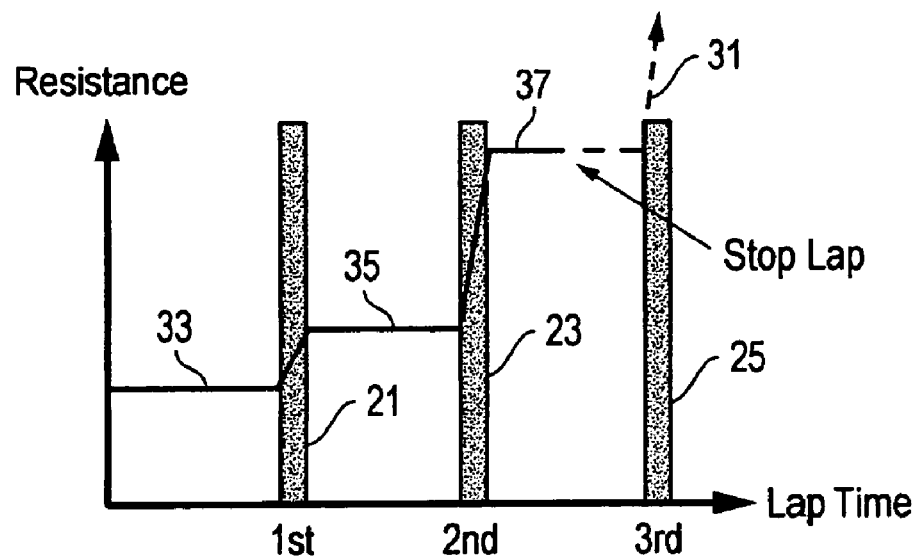
FIG. 3 is a plot of electrical resistance of the sensor of FIG. 2 during lapping and constructed in accordance with the present invention.

As the lapping device 12 laps the sensor 11, a resistance monitoring device 27 monitors a resistance of the sensor 11 during lapping. Each time an aperture (e.g., aperture 21) is lapped through, there is an increase in sensor resistance that is approximately equal to an inverse of a total area of the lapped through aperture 21. As an illustration, see plot 31 in FIG. 3. The initial resistance 33 of the sensor is lowest prior to lapping. In the embodiment shown, when the first aperture 21 is lapped through, the resistance 35 of the sensor 11 increases. The resistance 37 of the sensor increases again when the second aperture 23 is lapped through. In one embodiment, the sensor 11 may be configured such that, when the first aperture 21 is lapped through, there is a 50% increase in resistance, and a 100% increase in resistance when the second aperture 23 is lapped through. Thus, the resistance increases are relatively much larger than and readily distinguishable from noise generated from a smearing of conducting materials across the insulation layer 19 at the lapping surface 13.

In alternate embodiments, the second-to-last aperture 23 is much larger in size than a final aperture 25 in order to cause an even more dramatic increase in resistance when lapped. In addition, the apertures 21, 23, 25 may be evenly spaced apart from each other, other than a spacing between the third-to-last aperture 21 and the second-to-last aperture 23, which may be made unique so that it is easier to recognize lapping position relative to the sensor 11 and stop lapping at a desired location between the second-to-last aperture 23 and the final aperture 25. Other variations in the embodiments of the present invention are described above.

Figure 4:
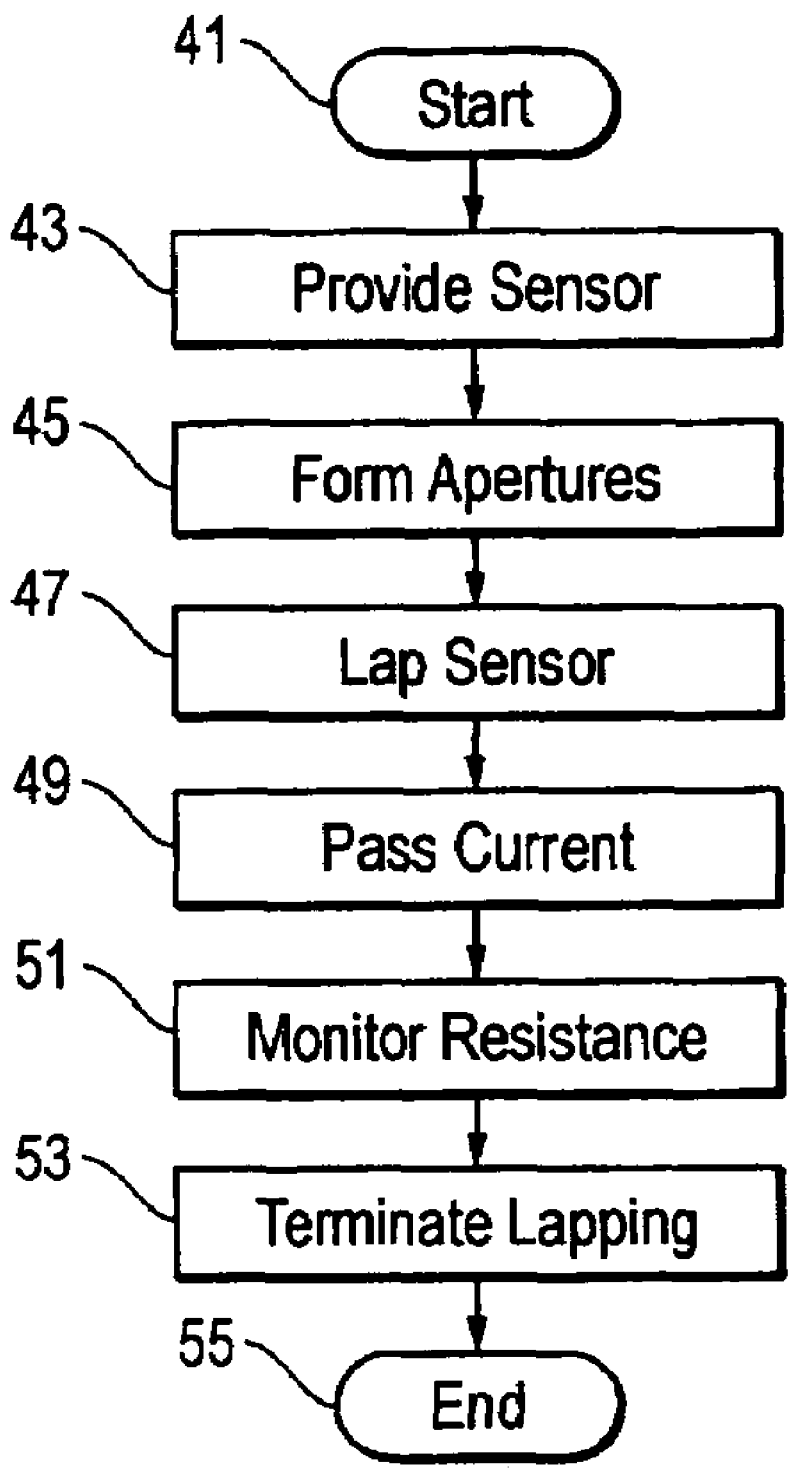
FIG. 4 is a simplified flowchart of one embodiment of a method constructed in accordance with the present invention.

The present invention also comprises a method (FIG. 4) of configuring a sensor for a hard disk drive. One embodiment of the method comprises starting as indicated at step 41, and providing a sensor (step 43) having a current-perpendicularto-the-plane (CPP) configuration with an air bearing surface, metallic layers, and an insulation layer between the metallic layers. As indicated at step 45, the method continues by forming filled apertures in the insulation layer, and lapping the sensor at the air bearing surface (step 47). As depicted at step 49, electrical current is passed between the metallic layers through the apertures in the insulation layer, and a resistance between the metallic layers is monitored during lapping. The method also comprises monitoring an increase in resistance (step 51) each time an aperture is lapped through; and then stopping the lapping (step 53) when a target resistance is achieved, before ending at step 55.

The method may further comprise stopping prior to lapping a final one of the apertures, and/or forming a linear array of apertures that are aligned perpendicular to a plane of an air bearing surface of the sensor. The method also may further comprise lapping through a first aperture and measuring a 50% increase in resistance, lapping through a second aperture and measuring a 100% increase in resistance, and the increases in resistance are relatively much larger than and readily distinguishable from noise generated from a smearing of conducting materials across the insulation layer at a lapping surface of the sensor. In addition, the method may comprise forming a second-to-last aperture much larger in size than a final aperture in order to cause an even more dramatic increase in resistance when lapped.

The method also may comprise evenly spacing the apertures apart from each other, other than a spacing between a third-to-last aperture and a second-to-last aperture, which is made unique so that it is easier to recognize lapping position relative to the sensor and stop lapping at a desired location between the second-to-last aperture and a final aperture. In another embodiment, the method comprises lithographically-defining the apertures at a size that is in a range of 5 nm to 40 nm; and/or positioning the a final one of the apertures within a few nanometers of the air bearing surface to maximize a signal from a disk and to prevent lapping damage to the final one of the apertures; and/or forming the apertures in various sizes, and spacing apart the apertures at various distances.

A method of configuring a sensor for a hard disk drive includes providing a magnetic sensor having a current-peroendicular-to-the-plane configuration with an air bearing surface, a plurality of metallic layers, and art insulation layer between at least two of the metallic layers; forming apertures in the insulation layer and filling the apertures with an electrically conductive material; lapping the sensor at the air bearing surface; passing electrical current between the metallic layers through the apertures in the insulation layer and monitoring a resistance between the metallic layers during lapping; monitoring an increase in resistance each time one of the apertures is lapped through; and then stopping the lapping when a target resistance is achieved.

While the invention has been shown or described in only some of its forms, it should be apparent to those skilled in the art that it is not so limited, but is susceptible to various changes without departing from the scope of the invention.

What is claimed is:

1. A method of configuring a sensor for a hard disk drive, comprising:
    (a) providing a magnetic sensor having a current-perpendicular-to-the-plane (CPP) configuration with an air bearing surface, a plurality of metallic layers, and an insulation layer between at least two of the metallic layers;
    (b) forming apertures in the insulation layer and filling the apertures with an electrically conductive material;
    (c) lapping the sensor at the air bearing surface;
    (d) passing electrical current between the metallic layers through the apertures in the insulation layer and monitoring a resistance between the metallic layers during lapping;
    (e) monitoring an increase in resistance each time one of the apertures is lapped through; and then
    (f) stopping the lapping when a target resistance is achieved.

2. The method of claim 1, wherein step (f) comprises stopping prior to lapping a final one of the apertures.

3. The method of claim 1, wherein step (b) of forming the apertures further comprises forming a linear array of apertures that are aligned perpendicular to a plane of an air bearing surface of the sensor.

4. The method of claim 1, wherein steps (c) though (f) comprise lapping through a third-to-last aperture and measuring a 50% increase in resistance, lapping through a second-to-last aperture and measuring a 100% increase in resistance, and the 50% and 100% increases in resistance are relatively much larger than and readily distinguishable from noise generated from a smearing of conducting materials across the insulation layer at a lapping surface of the sensor.

5. The method of claim 1, wherein step (b) comprises forming a second-to-last aperture much larger in size than a final aperture in order to cause an even more dramatic increase in resistance when lapped.

6. The method of claim 1, wherein step (b) comprises evenly spacing the apertures apart from each other, other than a unique spacing between a third-to-last aperture and a second-to-last aperture, so that the unique spacing is easier to recognize of a lapping position relative to the sensor and lapping is stopped at a desired location between the second-to-last aperture and a final aperture.

7. The method of claim 1, wherein step (b) comprises lithographically-defining the apertures at a size that is equal to or less than 40 nm.

8. The method of claim 1, wherein step (b) comprises lithographically-defining the apertures at a size that is in a range of 5 nm to 40 nm.

9. The method of claim 1, wherein step (b) comprises positioning a final one of the apertures within a few nanometers of the air bearing surface to maximize a signal from a disk and to prevent lapping damage to the final one of the apertures.

10. The method of claim 1, wherein step (b) comprises forming the apertures in various sizes, and spacing apart the apertures at various distances.

* * * * *